United States Patent
Tanabe et al.

(10) Patent No.: US 11,330,022 B2
(45) Date of Patent: May 10, 2022

(54) SYSTEM AND METHOD FOR SEPARATION OF CALL ORIGINATION AND CALL DELIVERY TECHNIQUES

(71) Applicant: Avaya Inc., Santa Clara, CA (US)

(72) Inventors: Jason G. Tanabe, Belleville (CA); Kyle Klassen, Ottawa (CA); Geoffrey L. Baskwill, Almonte (CA); Jason Milley, Kanata (CA)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/599,241

(22) Filed: Oct. 11, 2019

(65) Prior Publication Data

US 2020/0045088 A1 Feb. 6, 2020

Related U.S. Application Data

(63) Continuation of application No. 14/022,599, filed on Sep. 10, 2013, now abandoned.
(Continued)

(51) Int. Cl.
*H04L 29/06* (2006.01)
*H04W 8/18* (2009.01)
(Continued)

(52) U.S. Cl.
CPC ........ *H04L 65/1069* (2013.01); *H04L 65/102* (2013.01); *H04L 65/1006* (2013.01);
(Continued)

(58) Field of Classification Search
CPC ................................ H04W 8/18; H04W 88/06
See application file for complete search history.

(56) References Cited

U.S. PATENT DOCUMENTS 6,133,914 A * 10/2000 Rogers .................. G06F 3/0482
345/473
6,154,646 A * 11/2000 Tran ........................ H04W 4/16
455/417
(Continued)

FOREIGN PATENT DOCUMENTS

KR    1020060061480 A    6/2006
KR    1020080035817 A    4/2008
(Continued)

OTHER PUBLICATIONS

VOIP and IP Telephony: Planning for Convergence in State Government NASCIO, May 2005, www.nascio.org/portals/0/publications/documents/NASCIO-VOIP.pdf.
(Continued)

*Primary Examiner* — Daeho D Song
(74) *Attorney, Agent, or Firm* — Stevens & Showalter LLP

(57) ABSTRACT

Providing a user experience on a multimodal communications terminal configured to communicate according to a plurality of communication includes: executing a single application that provides a user experience (UX) for controlling user selection of preferences of the plurality of communication methods when originating or receiving communication sessions; and providing, via the single application, a selectable control that is persistent such that the selectable control is displayed in any screen of the single application, wherein the control allows selection of one of the plurality of communication methods to use for a particular communication session.

14 Claims, 4 Drawing Sheets

Related U.S. Application Data

(60) Provisional application No. 61/841,386, filed on Jun. 30, 2013.

(51) Int. Cl.
*H04L 65/1069* (2022.01)
*H04L 65/102* (2022.01)
*H04L 65/80* (2022.01)
*H04L 65/10* (2022.01)
*H04L 65/65* (2022.01)

(52) U.S. Cl.
CPC ........ *H04L 65/1009* (2013.01); *H04L 65/608* (2013.01); *H04L 65/80* (2013.01); *H04W 8/18* (2013.01)

(56) References Cited

U.S. PATENT DOCUMENTS

| | | | | |
|---|---|---|---|---|
| 7,174,187 B1 * | 2/2007 | Ngan | ................ | H04M 1/72403 455/552.1 |
| 7,286,651 B1 * | 10/2007 | Packingham | ........... | H04W 4/00 379/88.14 |
| 7,916,651 B2 * | 3/2011 | Pathak | .................... | H04L 69/14 370/241 |
| 7,925,688 B2 * | 4/2011 | Mampaey | ......... | H04L 29/06027 709/200 |
| 7,949,339 B2 * | 5/2011 | Hamano | ............... | H04W 36/24 455/445 |
| 8,010,112 B1 * | 8/2011 | Delker | .............. | H04W 36/0022 455/437 |
| 8,238,964 B2 * | 8/2012 | Hamano | ............... | H04W 48/18 455/552.1 |
| 8,644,817 B1 * | 2/2014 | Ezell | .................... | H04W 88/06 455/426.1 |
| 8,670,546 B2 * | 3/2014 | Wohlert | ................ | H04M 3/436 379/221.01 |
| 8,706,087 B2 * | 4/2014 | Qu | ........................ | H04L 51/066 455/412.1 |
| 8,768,293 B1 * | 7/2014 | Weng | .................... | H04M 11/04 455/404.2 |
| 8,811,954 B1 * | 8/2014 | Mahdi | .................. | H04M 7/006 455/414.1 |
| 8,838,101 B2 * | 9/2014 | Karaoguz | ......... | H04M 1/72403 455/435.2 |
| 9,055,413 B2 * | 6/2015 | Rosener | .............. | H04M 1/6066 |
| 9,131,006 B2 * | 9/2015 | Raju | .............. | H04L 67/2823 |
| 9,204,359 B2 * | 12/2015 | Sapkota | ............ | H04W 36/0022 |
| 9,265,082 B2 * | 2/2016 | Wilson | .............. | H04M 3/42246 |
| 2003/0227939 A1 * | 12/2003 | Yukie | ................. | H04L 61/1535 370/465 |
| 2004/0192301 A1 * | 9/2004 | Shi | ........................ | H04W 48/18 455/435.1 |
| 2005/0100008 A1 * | 5/2005 | Miyata | ................ | H04L 63/0421 370/389 |
| 2005/0147057 A1 * | 7/2005 | LaDue | ................ | H04W 28/06 370/310 |
| 2007/0072595 A1 * | 3/2007 | Pi | ...................... | H04M 1/72403 455/415 |
| 2007/0117588 A1 * | 5/2007 | Uehara | .................. | H04W 4/16 455/561 |
| 2007/0286162 A1 * | 12/2007 | Fabbrizio | ............ | H04L 65/1069 370/352 |
| 2008/0008162 A1 * | 1/2008 | Martinez | ................. | H04L 45/12 370/352 |
| 2008/0176552 A1 * | 7/2008 | Hamano | ............... | H04W 48/18 455/422.1 |
| 2008/0192732 A1 * | 8/2008 | Riley | ...................... | H04L 67/04 370/352 |
| 2008/0222294 A1 * | 9/2008 | Liang | .................... | H04W 36/24 709/227 |
| 2009/0161629 A1 * | 6/2009 | Purkayastha | ..... | H04W 36/0011 370/331 |
| 2009/0181657 A1 * | 7/2009 | Ramanathan | ......... | H04M 1/724 455/415 |
| 2009/0238194 A1 * | 9/2009 | Basart | .................... | H04L 12/66 370/401 |
| 2010/0009674 A1 * | 1/2010 | Sapkota | ............... | H04L 65/1093 455/426.1 |
| 2011/0003590 A1 * | 1/2011 | Yoon | ........................ | H04W 8/18 455/432.1 |
| 2011/0103369 A1 * | 5/2011 | Beker | .................. | H04M 7/0069 370/352 |
| 2011/0197280 A1 * | 8/2011 | Young | .................. | H04L 63/1416 726/24 |
| 2011/0217873 A1 * | 9/2011 | Diab | ...................... | H01R 13/66 439/620.01 |
| 2011/0249658 A1 * | 10/2011 | Wohlert | .................. | H04L 67/24 370/338 |
| 2012/0137307 A1 * | 5/2012 | Sarferaz | ................. | G06Q 10/10 719/317 |
| 2012/0155445 A1 * | 6/2012 | Javaregowda | ...... | H04L 65/1083 370/338 |
| 2012/0157059 A1 * | 6/2012 | Raju | .................. | H04L 67/2823 455/411 |
| 2012/0225652 A1 * | 9/2012 | Martinez | ............. | H04L 65/1006 455/435.1 |
| 2012/0275583 A1 * | 11/2012 | Katis | ................... | H04L 61/2503 379/88.22 |
| 2013/0067099 A1 * | 3/2013 | Ravindranath | ... | H04L 29/12009 709/227 |
| 2013/0108994 A1 * | 5/2013 | Srinivasa | ............. | G09B 21/009 434/156 |
| 2014/0032740 A1 * | 1/2014 | Wilson | .............. | H04M 3/42246 709/224 |
| 2015/0004965 A1 * | 1/2015 | Tanabe | ................ | H04L 65/1006 455/426.1 |
| 2015/0043387 A1 * | 2/2015 | Mahdi | ..................... | H04W 4/16 370/259 |
| 2015/0055554 A1 * | 2/2015 | Sedlacek | ............... | H04W 76/50 370/328 |

FOREIGN PATENT DOCUMENTS

| | | |
|---|---|---|
| KR | 100893059 B1 | 4/2009 |
| KR | 1020110033470 A | 3/2011 |
| WO | 2007092788 A2 | 8/2007 |

OTHER PUBLICATIONS

Notice of Allowance with English Translation for Korea Patent Application No. 2013-00075134, dated Aug. 26, 2014 3 pages.
Official Action with English Translation for Korea Patent Application No. 2013-0075134, dated Apr. 23, 2014 12 pages.
Barry, Lance Leonard; Non-Final Office Action; U.S. Appl. No. 14/022,599; dated Jul. 8, 2019; United States Patent and Trademark Office; Alexandria, Virginia.
Barry, Lance Leonard; Non-Final Office Action; U.S. Appl. No. 14/022,599; dated Mar. 13, 2019; United States Patent and Trademark Office; Alexandria, Virginia.
Barry, Lance Leonard; Final Office Action; U.S. Appl. No. 14/022,599; dated Jul. 6, 2018; United States Patent and Trademark Office; Alexandria, Virginia.
Barry, Lance Leonard; Non-Final Office Action; U.S. Appl. No. 14/022,599; dated Jan. 26, 2018; United States Patent and Trademark Office; Alexandria, Virginia.
Barry, Lance Leonard; Final Office Action; U.S. Appl. No. 14/022,599; dated Aug. 15, 2016; United States Patent and Trademark Office; Alexandria, Virginia.
Barry, Lance Leonard; Non-Final Office Action; U.S. Appl. No. 14/022,599; dated Mar. 14, 2016; United States Patent and Trademark Office; Alexandria, Virginia.
Scott, Randy A.; Notice of Allowance; U.S. Appl. No. 13/559,417, dated Nov. 12, 2015; United States Patent and Trademark Office; Alexandria, Virginia; United States.
Scott, Randy A.; Final Office Action; U.S. Appl. No. 13/559,417, dated Jun. 15, 2015; United States Patent and Trademark Office; Alexandria, Virginia; United States.

(56) References Cited

OTHER PUBLICATIONS

Scott, Randy A.; Non-Final Office Action; U.S. Appl. No. 13/559,417, dated Mar. 5, 2015; United States Patent and Trademark Office; Alexandria, Virginia; United States.

* cited by examiner

300

400

SYSTEM AND METHOD FOR SEPARATION OF CALL ORIGINATION AND CALL DELIVERY TECHNIQUES

CROSS-REFERENCE TO RELATED APPLICATIONS

This application is a continuation of U.S. patent application Ser. No. 14/022,599, filed Sep. 10, 2013, claims the benefit of U.S. Provisional Patent Application Ser. No. 61/841,386, filed on Jun. 30, 2013, the entire contents of which are hereby incorporated by reference in their entirety.

BACKGROUND

Field of the Invention

System and method to separate call origination techniques from call delivery techniques under a coordinated user experience. More particularly, embodiments provide an ability to separate the call method used to originate calls from the method to receive calls.

Description of Related Art

Applications generally have a single method to make and receive calls. For example, a SIP phone makes and receives calls using SIP. A cellular phone and makes and receive calls using the cellular network.

Some methods provide server-side choice to deliver a call over one of several delivery methods when more than one method is available. Such methods are used to resolve a scenario in which more than one call may be sent to the same mobile device at substantially the same time using different communication methods (e.g., both EC500 and SIP). In this case, a call manager would apply logic to deliver the call to the mobile device only by use of a preferred communication method (e.g., by SIP). This does not address the issue of striving to provide a consistent user experience for different communication methods, or attempt to provide for the separation of call origination and call delivery techniques.

The known art falls short of providing a satisfactory user experience in several respects. First, to change communication methods, administrative changes may be needed, resulting in additional information technology ("IT") cost and overhead. Another shortcoming is that user capabilities to configure a default communication method do not conveniently provide users with sufficient flexibility to deal with dynamic network conditions experienced on a mobile device. For example, if network conditions change, then the default communication method may not work well or be available for the next call under the new network conditions.

Another shortcoming is that certain benefits of making calls in one communication method (e.g. VoIP to take advantage of low cost) and receiving calls in a different communication method (e.g., cellular to take advantage of maximizing coverage) cannot be realized if the origination and delivery method are difficult or impossible to reconfigure by the relatively inflexible methods of the known art. For example, an application may make real-time decisions about incoming and outgoing call communication methods based on dynamic cost factors. A mobile user may be within a home region when receiving a call, but may travel to a roaming region when making a call.

Furthermore, cost factors may not be symmetrical. At any point in time what is optimal outbound may not always be optimal for inbound calls. For example, outbound cellular calls when roaming are charged different rates vs. incoming calls. If there is a calculation of cellular vs. VoIP options the differences in cost may result in a different option being selected inbound vs. outbound depending on the calculation at a particular point in time. A user may want to originate calls with video because they can adequately prepare or be sure they are in an appropriate environment for a video call whereas there is a desire to have all incoming calls to default initially to audio-only so that the user can decide later to add video if and when the user is in an appropriate environment.

When developing an application that runs on a mobile device that can make either SIP or cellular calls in addition to having different call origination techniques over each network (e.g., personal cellular calls that bypass the enterprise or enterprise callback calls over the cellular network) there needs to be a way to organize the user experience in a consistent, simple and intuitive way. When attempting to solve this problem, there is benefit to providing the ability to separate the call method used to originate calls from the method to receive calls.

Thus, there is a need to organize the user experience in a consistent, simple and intuitive way by providing a consistent user experience for different communication methods, while allowing for the separation of call origination and call delivery techniques.

SUMMARY

Embodiments of the present invention include an apparatus and method to separate call origination techniques from call delivery techniques under a single coordinated user experience. More particularly, embodiments of the present invention provide an ability to separate the call method used to originate calls from the method to receive calls.

Embodiments in accordance with the present invention include a method for providing a user experience on a multimodal communications terminal configured to communicate according to a plurality of communication methods, wherein the method includes executing, by a processor, a single application that provides a user experience (UX) for controlling user selection of preferences of the plurality of communication methods when originating or receiving communication sessions; and providing, by the processor via the single application, a selectable control that is persistent such that the selectable control is displayed in any screen of the single application, wherein the control allows selection of one of the plurality of communication methods to use for a particular communication session.

Other embodiments of the present invention relate to a system for providing a user experience on a multimodal communications terminal configured to communicate according to a plurality of communication methods, wherein the system includes a memory device storing executable instructions and a processor in communication with the memory device. In particular, executing the executable instructions by the processor causes the processor to implement a single application that provides a user experience (UX) for controlling user selection of preferences of the plurality of communication methods when originating or receiving communication sessions; and provide via the single application, a selectable control that is persistent such that the selectable control is displayed in any screen of the single application, wherein the control allows selection of one of the plurality of communication methods to use for a particular communication session.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
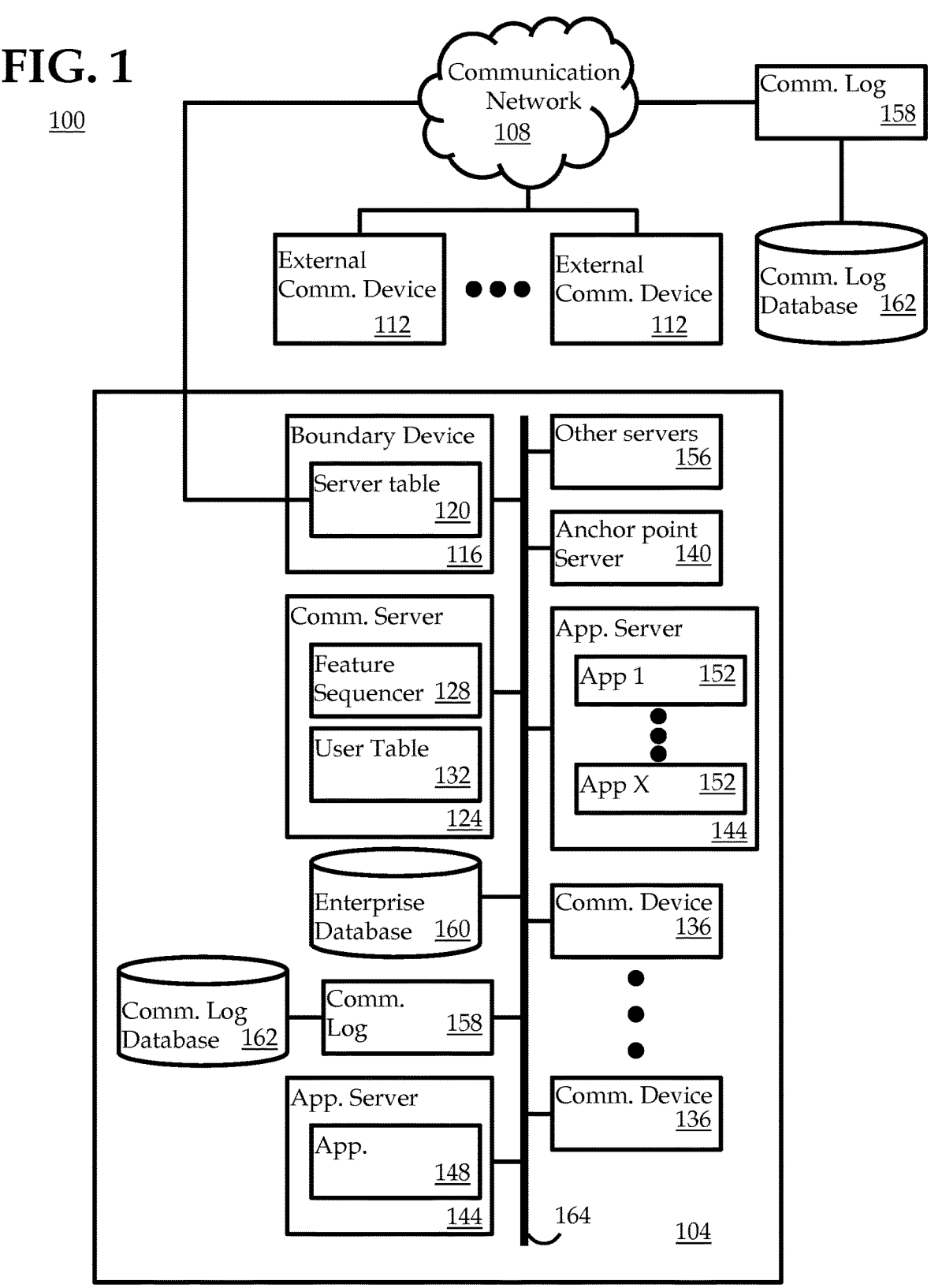
FIG. 1 is a block diagram depicting a system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize different communication methods and/or protocols.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

Embodiments in accordance with the present invention provide solutions based on a standard communication method (e.g., SIP, H.323, etc.) for providing communication services.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The terms "switch," "server," as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication method. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions.

These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Users or any other addressable entities in a SIP framework are identified by Universal Resource Identifiers (URI). Each such Internet-style address (for example, sip:johndoe@avaya.com) maps into one or more Contacts, each of which typically represents a device or service at which the corresponding user may be reached. Examples are phones, desktop multimedia clients, instant message accounts, e-mail accounts and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The communication method also provides mechanisms to specify the type of session that is requested as well as means to change session parameters.

SIP is not a vertically integrated communications system. SIP is rather a component that can be used with other IETF protocols to build a complete multi-media architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users. However, the basic functionality and operation of SIP does not depend on any of these protocols.

The Real-Time Transport Control Protocol ("RTCP") is a protocol that is known and described in Internet Engineering Task Force (IETF) Request For Comment RFC 3550. RTCP provides out-of-band statistics and control information for an RTP media stream. It is associated with RTP in the delivery and packaging of a media stream, but does not transport the media stream itself. Typically RTP will be sent on an even-numbered UDP port, with RTCP messages being sent over the next higher odd-numbered port. RTCP may be used to provide feedback on the quality of service ("QoS") in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control quality of service parameters, for instance by limiting a flow rate or by using a different codec.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express~ and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users are not necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine the call is directed toward the first enterprise user, reference the server table 120 to identify the authoritative communications server 124 for the first enterprise user, and route the inbound call to the authoritative communications server 124.

Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up.

In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 may include a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence that will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type, or any combination thereof, can be included in a single application sequence without departing from the scope of the present invention.

The term "user experience" ("UX") as used herein refers to any method and/or sensory perception by which a user and a device, machine, or a computer system interact, including the use of hardware (physical components), input devices, output devices, design of how information is received from or presented on such devices, and software (logical components). A user experience provides a method and/or sensory perception by which a user may provide input or exert control in order to assist a user to manipulate a system, and/or receive or perceive output, and allowing the system to indicate the effects of the users' manipulation. An application has a user interface that may provide a user experience. If multiple distinct user experiences are provided, e.g., by different applications with different deployment models, then the different applications may be referred to as being disjoint applications.

The term "communication method" as used herein refers to a method of communicating at a physical-level or protocol-level of networking. For example, a communication method may include SIP, H.323, and/or refer to origination or deliver of calls using a cellular network. A user experience of various embodiments may support more than one communication method. A communication terminal (e.g., a mobile phone) that supports more than one communication method may be referred to herein as a multimodal communication terminal. For example, a multimodal communication terminal may refer to a smartphone (e.g., an iPhone™, Droid™, or the like) with many application programs on it, such that different application programs implement different communication methods.

The term "registration" as used herein refers to a technical process of associating a user or application with a communication method, typically as part of a protocol when requesting or initiating service. For example, in SIP a user must register with a registrar in order to receive service.

Previous methods provide a less-than-satisfying user experience by using different application programs ("apps"), running on user end terminals, for different communication methods. For example a native cellular application on a mobile phone may be used to originate and accept cellular calls and another application (e.g., Skype™) is used to make and receive VoIP calls. Because a user may often make calls using different applications with corresponding different user experiences, this causes different user experiences to be presented to the user, leading to user confusion and inefficiency.

Another method is usage of a single application that provides users the ability to select a single communication mode (e.g., SIP mode or cellular mode) for use that is selected from among more than one mode. The selected mode would be used to originate and receive all calls using that communication method. For example, the single application may contain all of the protocol components needed to support multiple communication methods (e.g., cellular, Skype™, SIP, etc.) and the host communication device includes all of the communication interfaces (e.g., cellular radio, Wi-Fi, etc.) needed to support the available communication methods. A user is then able to use a control to toggle between available modes from within a single app.

Embodiments in accordance with the present invention provide support for multiple communication methods, and manage communication method selection by determining availability of the supported set of communication methods and presenting the candidate communication methods to a user in real time based on user or programmatic factors. Managing communication method selection may include, e.g., providing dynamic menus of communication method options presented as a tappable/clickable/selectable button in a prominent location of the main application screen. User or programmatic factors may include, e.g., whether a physical networking layer supporting the communication method is available, or whether the service has been configured correctly by the user.

An example of programmatic factors may include, for each call, determining the comparative costs at the present time and at the present location for various communication methods (e.g., VoIP, cellular outbound, cellular call back, etc.), then selecting the best (e.g., least-costly, or best balance of cost and capacity, etc.) method for the inbound and/or outbound calls.

Embodiments in accordance with the present invention separate a method of call origination from a method of call delivery so a user can select an outbound communication method (e.g., SIP, VoIP, etc.) and then separately select an inbound communication method for calls to their identity. An identity may be, e.g., an enterprise identity which is typically a users extension (e.g. x2356), a work public telephone number such as +16135552356, a SIP address such as JohnDoe@avaya.com, or any combination thereof, and so forth. Multiple communication channels may be associated with an identity, e.g., a cell phone number, a Wi-Fi or Ethernet connection for VoIP calls, such that a call to the identity may be delivered by any of those communication channels according to user preference.

In particular, the type of terminal does not determine the communication method. For example, a single mobile device may have cellular voice service, a SIP client, a Skype client, a H.323 client, and some PBXs linked to the mobile phone may also have an ability to fork incoming calls to other PSTN numbers (e.g., a home phone, a hotel phones, etc.). Because incoming calls to the enterprise identity may be delivered to any one of these destinations or apps on the mobile device, or to other PSTN numbers, embodiments in accordance with the present invention provide an improved way to allow users to understand and control when, where, and how incoming or outgoing calls are independently delivered or originated. The independence allows the delivery method to be optimized independently of the session origination method. For example, sessions may be originated as video calls whenever possible, but always ensure that inbound sessions may default to cellular unless another method is selected.

Embodiments in accordance with the present invention provide user control over the outbound and inbound communication methods via a single coordinated user experience, which in at least some embodiments is provided by a single application program.

In some embodiments, the single application program may be used to support different underlying communications technologies (e.g. SIP/H.323/cellular voice), as well as providing a user experience ("UX") model under user control that allows for one UX interface for the origination of calls and a separate UX interface for the delivery of calls. The UX model involves different registrations. Registration in this context means "authenticated and authorized connections with a server/service". A user must 'login' to some services in order to register and to enable a communication method.

For example, for callers, embodiments provide a UX to the user that allows a user to select preferred and/or supported call origination method(s) (e.g., EC500 vs SIP), and save that selection as registrations, one registration per selected communication method. The embodiments then maintain those registrations and originate calls only using the communication method the caller selected for outgoing calls.

For callees, embodiments manage delivery of calls to the different registrations defined by the callee for incoming calls, independent of the selected call origination method. Embodiments thus provide an application that has an adaptable user interface that can provide multiple UX interfaces to users, and which manages different registrations based upon user preferences. This allows for separation of origination and delivery UX and communication method selections, and then use that selection to manage the underlying registrations for each of those services.

More broadly, embodiments in accordance with the present invention provide for multiple call origination methods, e.g., $[Co_1, Co_2, \ldots, Co_N]$. For example: "$Co_1$" may represent cellular voice, and "$Co_2$" may represent usage of SIP. Embodiments may further provide for multiple call delivery methods, e.g., $[Cd_1, Cd_2, \ldots Cd_N]$. For example: "$Cd_1$" may represent usage of the cellular voice network to deliver the call to a mobile phone number, "$Cd_2$" may represent usage of SIP, and "$Cd_3$" may represent an enterprise call server forking an incoming calls to a predetermined PSTN number (e.g. home phone, hotel room).

Embodiments in accordance with the present invention provide a user experience that allows the user to provide independent preferences for both the primary call origination and call delivery methods. There is no requirement the call origination and call delivery methods must match. For example, the user can make calls using SIP but receive calls on their mobile phone via the cellular network or home phone via the PSTN.

Embodiments may automate the selection of the call origination and call delivery methods in real-time based on network factors, cost factors, and/or other factors. Network factors may include moving or roaming from a Wi-Fi data network to a 3G Data network. Cost factors may include absolute cost (e.g., compared to a predetermined threshold), relative costs (e.g., lower than another available method), or some combination of such factors. Other factors may include losing the data network entirely, presence or location information of the user, security policy, enterprise or user preference, as well as other factors discussed earlier. Presence as used herein is the availability and willingness of an entity to communicate. Embodiments may completely automate (i.e., make autonomous) selection of the call origination and delivery techniques, in real-time based upon predetermined network factors, cost factors, and/or other factors, without requiring selection of techniques by the user.

Embodiments in accordance with the present invention include a process to present the call origination method as a control that is persistent throughout an application implementing the process such that, once set by the user, the control set by the user will apply to any call instantiation from any screen. The control will persist over multiple communication sessions. For example, calls made from a contact, call history list, or voicemail would all be subject to this common control. Unlike a static configuration option, the control set by the user is presented as a control that is globally visible to the user, so the user can reset the setting of the control at any time.

Embodiments in accordance with the present invention preserve the user's selections if services are interrupted or become unavailable. Network connectivity may come and go due to factors like loss of wireless coverage, dead battery, etc. Preservation of the setting of the selected control prevents user surprise in which otherwise a user may think they are using one communication method (e.g., VoIP) because that is what they last selected, when in fact the communication method may be different due to an automatic change triggered in the background by a network event, thereby causing the call to be originated using a method the user did not expect (e.g., a cellular call), and incurring roaming charges. In this way, the user's device will not automatically change the user's selection. An automatic change to the user's selection may risk, e.g., triggering use of cellular or 3G in situations where coverage and the attendant costs could have discouraged use of those communication methods.

Compared to the known art, embodiments in accordance with the present invention provide a single application and single deployment model interface. Deployment model and deployment model interface refer to a process by which applications are distributed to users and configured for use. The single app and single deployment model allows for multiple communication methods to be provided and supported relatively efficiently, rather than relying upon multiple independent (i.e., distinct) and/or disjoint applications with different deployment models.

Embodiments allow a user to pick a call origination method manually as required, independently of a call delivery method. Available communication methods may change over time (e.g., traveling out of a coverage area, entering a building, etc.), so methods may be picked when different services are available at the time the call is to be established or to be received. This kind of flexible approach to method selection allows users to benefit from advantages offered by both inbound and outbound communication methods that are selected when needed, e.g., as inbound calls and outbound calls take place at different times under changing conditions, without being forced to choose a fixed method for inbound and outbound calling.

Embodiments provide an ability to programmatically improve call origination independently of call delivery. For example, automated logic may optimize call initiation and delivery at a finer level of detail than if they are managed together. The automated logic and finer level of detail may pertain to improved cost control. For example, there are cost factors related to data for VoIP calls, cost factors for calls originated from a mobile phone, different cost factors for calls received on a mobile phone, roaming, and so forth. The automated logic may calculate and determine which methods are optimal or closer to optimal for inbound and outbound calls at any point in time. Similar improvements to the user experience is possible (e.g., maximize inbound coverage using cellular but outbound voice quality using VoIP). Embodiments also allow for usage of policy requirements, e.g., that outbound calls may default to video calls but inbound calls always start as an audio call that is upgradeable to a video call (thus preventing potential surprise to a callee).

Figure 2:
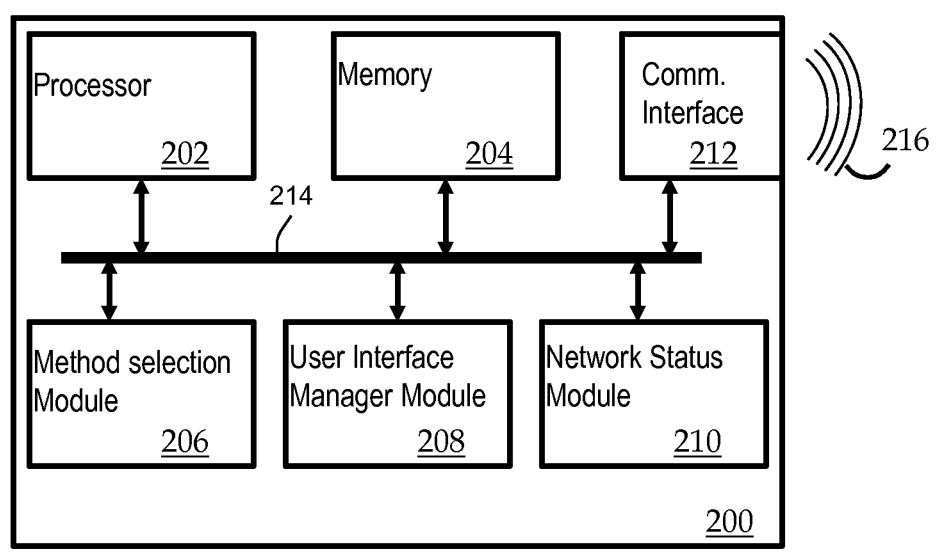
FIG. 2 is a block diagram of an end terminal communication device in accordance with an embodiment of the present invention.

FIG. 2 illustrates a block diagram of a user end terminal communication device 200 such as external communication device 112, in accordance with an embodiment of the present invention. Device 200 includes processor 202, memory 204, communication method selection module 206, user interface manager module 208, network status module 210 and communication interface 212, interconnected as shown by communication path 214 (e.g., a bus). Communication interface 212 communicates with devices outside of communication device 200 by way of communication channel 216. Although communication channel 216 is depicted as a wireless interface (e.g., cellular telephony signals, Wi-Fi, Bluetooth™, etc.), communication channel 216 may also be a wired interface (e.g., CAT-5 Ethernet).

Communication method selection module 206 functions to manage a selection of communication methods that may be available for incoming calls and outgoing calls, depending upon at least user preferences and/or network conditions. Communication method selection module 206 may include instructions stored in memory 204 which, when performed by processor 202, performs the functions of communication method selection module 206.

User interface manager module 208 functions to gather user preferences, and to provide a user experience that is presented to the user of communication device 200, depending upon at least the selection of communication methods that may be available for incoming calls and outgoing calls as determined by the communication method selection module 206 and network conditions. User interface manager module 208 may include instructions stored in memory 204 which, when performed by processor 202, performs the functions of user interface manager module 208.

Network status module 210 functions to determine network conditions that may be relevant to communication methods that may be available for incoming calls and outgoing calls, depending upon at least user preferences gathered by interface manager module 208. Network status module 210 may include instructions stored in memory 204 which, when performed by processor 202, performs the functions of network status module 210.

Figure 3:
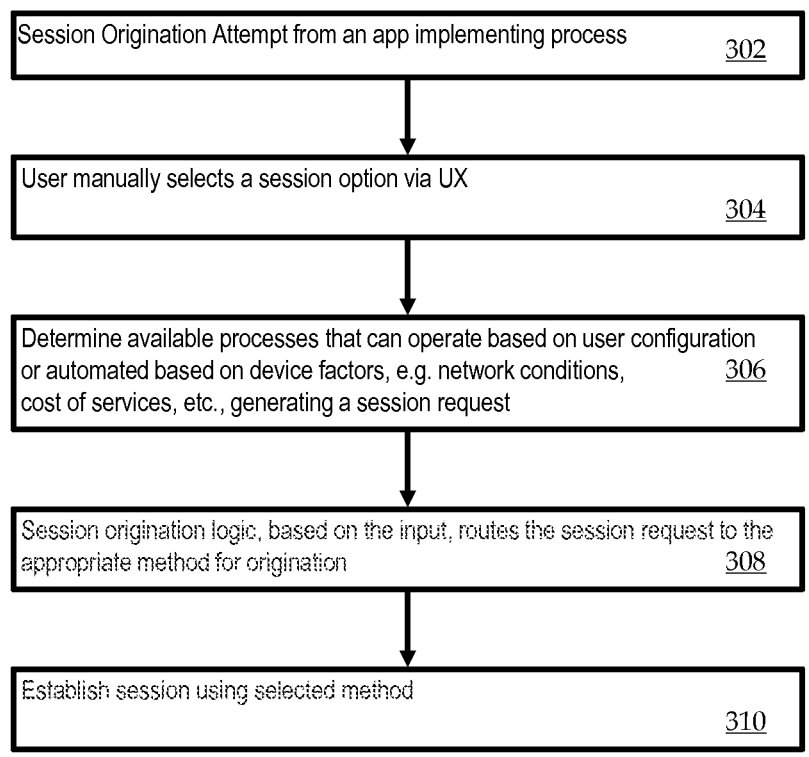
FIG. 3 illustrates at a high level of abstraction a method for session origination, in accordance with an embodiment of the present invention.

FIG. 3 illustrates a process 300 for session origination in accordance with an embodiment of the present invention. Process 300 begins at step 302, at which a session origination attempt was received from an application program (i.e., "app") that implements an embodiment in accordance with the present invention.

Next, at step 304, processor 202 receives an indication from a user, via user interface manager module 208 on the user's end terminal communication device 200, regarding a session option preference. The preference may be a stored preference recalled from memory 204, or may be a preference that is manually provided at the time the user begins originating the session.

Next, at step 306, processor 202 in end terminal communication device 200 will select an available communication method that may be used, as determined by communication method selection module 206 based upon either a user configuration (e.g., from step 304), or an automated method based upon network factors gathered by network status module 210, e.g., network conditions, cost of services, etc.

Next, at step 308, processor 202 in end terminal communication device 200, based on the input provided by step 306, formulates a session request and will route the session request via bus 214 to processes implementing the selected communication method in order to be originated.

Input to the session origination logic may include information such as: an option selected by the user at step 304; results of a real-time analysis of network performance; cost of voice minutes on the current network vs. data cost for a VoIP call; and so forth. The application call origination logic selects from the available origination methods and originates the call attempt using whichever method is best suited for that call at that point in time, as either manually configured by the user or algorithmically selected.

An example of an automated method based upon device factors may include one or more of the following steps: (1) If Wi-Fi is available then use SIP, else use cellular; (2) If Wi-Fi is available then make a video call, else make an audio-only call; and (3) If network quality is >X (i.e., is greater than a predetermined threshold) then use SIP, else use cellular voice.

Embodiments of the present invention select the origination type among a set of available options and that selection is independent of how calls are delivered to this device.

Finally, at step 310, the session is established using the selected method. The available origination methods could be protocols (e.g. SIP, H.323, etc.), device services (e.g., cellular voice), or other communications applications on the device (e.g., Skype™, FaceTime™, etc.).

Figure 4:
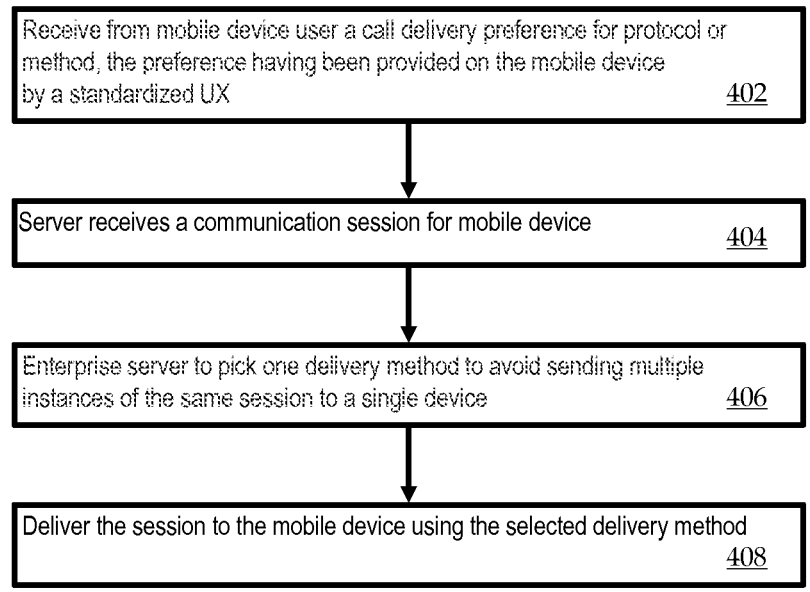
FIG. 4 illustrates at a high level of abstraction a method for session termination, in accordance with an embodiment of the present invention.

FIG. 4 illustrates a process 400 for session delivery in accordance with an embodiment of the present invention. Process 400 begins at step 402, at which a server receives from a user's end terminal a call delivery preference for a protocol or communication method. The user had provided this preference on their end terminal by way of a standardized user experience.

Next, at step 404, a server receives a communication session destined for an end terminal such as a mobile device. Process 400 is not limited to mobile devices, but may be adapted to other types of communication terminals. Next, at step 406, if more that one delivery communication method is available (e.g., either SIP or EC500), the server will select one delivery communication method in order to avoid sending multiple instances of the same session to a single device. The selection may depend upon factors described earlier. Next, at step 408, the server will deliver the session to the end terminal using the selected communication method. Process 400, and in particular step 406, is further described in co-pending and commonly-owned U.S. patent application Ser. No. 13/559,417, the entire content of which is hereby incorporated by reference in its entirety.

Embodiments of the present invention include a system having one or more processing units coupled to one or more memories. The one or more memories may be configured to store software that, when executed by the one or more processing unit, allows practice of the embodiments described herein, at least by use of processes described herein, including at least in FIGS. 2-4, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate the list items are representative of the embodiments and the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A method for providing a user experience on a multi-modal communications terminal configured to communicate according to a plurality of communication methods, comprising:
   executing, by a processor, a single application that provides a user interface for controlling user selection of preferences of the plurality of communication methods for each of incoming and outgoing communication sessions;
   providing, by the processor via the single application, a selectable control that is displayed via the user interface in any screen of the single application, wherein the selectable control allows user selection of one of the plurality of communication methods to use for a particular communication session of the incoming or outgoing communication sessions, and wherein the selectable control comprises a first option for selecting, via the user interface, an origination method preference for the outgoing communication sessions and a second option for selecting, via the user interface, a delivery method preference for the incoming communication sessions; and
   initiating, by the processor via the single application, outgoing communication sessions according to the selected first option for the outgoing communication sessions, and delivering, by the processor via the single application, incoming communication sessions according to the selected second option for the incoming communication sessions.

2. The method of claim 1, wherein the selectable control comprises dynamic menus of communication method options in the user interface.

3. The method of claim 1, wherein the plurality of communication methods comprises a plurality of call origination methods for the outgoing communication sessions.

4. The method of claim 3, wherein the plurality of call origination methods comprises at least two of Session Initiation Protocol (SIP), cellular voice, or public switch telephone network (PSTN) voice.

5. The method of claim 1, wherein the plurality of communication methods comprises a plurality of call delivery methods for the incoming communication sessions.

6. The method of claim 5, wherein the plurality of call delivery methods comprises at least two of cellular voice, SIP, or PSTN voice.

7. The method of claim 1, further comprising:
   determining, by the processor, a supported set of the plurality of communication methods that are available; and
   displaying, by the processor, via the selectable control of the user interface the supported set.

8. A system for providing a user experience on a multi-modal communications terminal configured to communicate according to a plurality of communication methods, comprising:
   a memory device storing executable instructions; and
   a processor in communication with the memory device, wherein executing the executable instructions by the processor causes the processor to:
      implement a single application that provides a user interface for controlling user selection of preferences of the plurality of communication methods for each of incoming and outgoing communication sessions;
      provide, via the single application, a selectable control that is displayed via the user interface in any screen of the single application, wherein the selectable control allows user selection of one of the plurality of communication methods to use for a particular communication session of the incoming or outgoing communication sessions, and wherein the selectable control comprises a first option for selecting, via the user interface, an origination method preference for the outgoing communication sessions and a second option for selecting, via the user interface, a delivery method preference for the incoming communication sessions; and
      initiate or deliver, via the single application, outgoing communication sessions and incoming communication sessions independently according to the selected first option for the outgoing communication sessions and the selected second option for the incoming communication sessions.

9. The system of claim 8, wherein the selectable control comprises dynamic menus of communication method options in the user interface.

10. The system of claim 8, wherein the plurality of communication methods comprises a plurality of call origination methods for the outgoing communication sessions.

11. The system of claim 10, wherein the plurality of call origination methods comprises at least two of Session Initiation Protocol (SIP), cellular voice, or public switch telephone network (PSTN) voice.

12. The system of claim 8, wherein the plurality of communication methods comprises a plurality of call delivery methods for the incoming communication sessions.

13. The system of claim 12, wherein the plurality of call delivery methods comprises at least two of cellular voice, SIP, or PSTN voice.

14. The system of claim 8, wherein executing the executable instructions by the processor causes the processor to:
  determine a supported set of the plurality of communication methods that are available; and
  display via the selectable control of the user interface the supported set.

* * * * *